(No Model.)
E. HUBER.
ROAD SCRAPER.
No. 283,607. Patented Aug. 21, 1883.
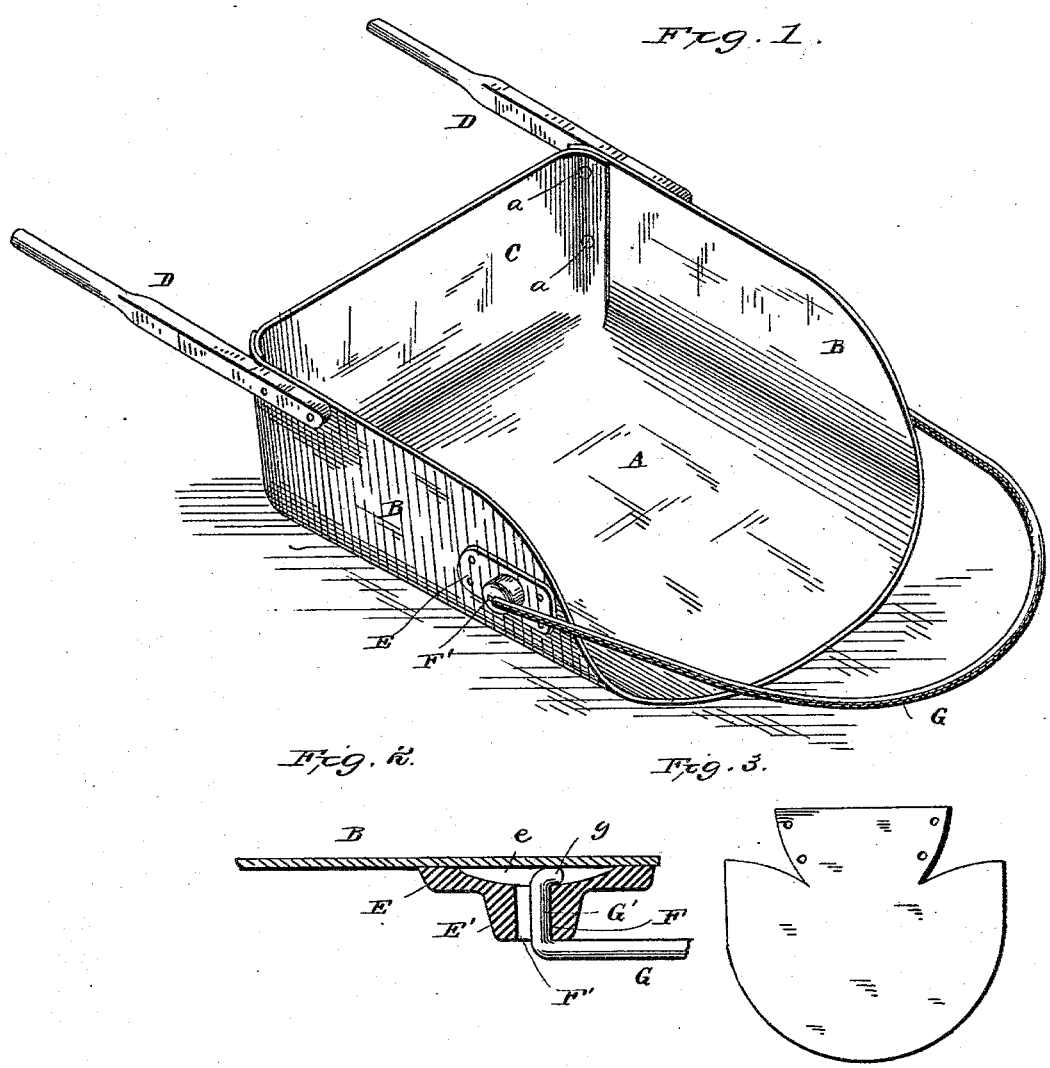
Witnesses.
Edwin L. Yewell.
Chas. D. Davis.
Inventor.
Edward Huber.
E. M. Alexander.
Attorney.

UNITED STATES PATENT OFFICE.

EDWARD HUBER, OF MARION, OHIO.

ROAD-SCRAPER.

SPECIFICATION forming part of Letters Patent No. 283,607, dated August 21, 1883.

Application filed March 16, 1883. (No model.)

*To all whom it may concern:*

Be it known that I, EDWARD HUBER, a citizen of the United States, residing at Marion, in the county of Marion and State of Ohio, have invented certain new and useful Improvements in Road-Scrapers, of which the following is a specification, reference being had therein to the accompanying drawings.

This invention relates to certain new and useful improvements in metallic road-scrapers, having special reference to that class in which the scraper is adapted to be drawn over the ground and to scoop or scrape the earth; and it consists in the combination, in a road-scraper, of an ear having an aperture and a slot at one side, with a bail having a right-angled lug, whereby the bail is held in place and rendered detachable, as more fully hereinafter specified.

In the accompanying drawings, forming a part of this specification, and on which like letters of reference indicate corresponding parts, Figure 1 represents a perspective view of my improved road-scraper, having the usual guide-handles and draft-bail attached thereto; Fig. 2, a horizontal sectional view through a portion of one side of the scraper and diametrically through the ear by which the bail is connected to the body, and Fig. 3 a plan view of the blank from which the scraper is formed.

The letter A indicates the body of a scraper, the same being constructed of iron or any other suitable material. The blank from which it is formed is cut rounding at its forward end, thereby making the cutting-edge of the scraper slightly rounding and the sides of the same to incline back. That portion of the blank which forms the back C of the scraper-body has its ends cut, as indicated in Fig. 3 of the drawings, and the rear ends of the side pieces, B, are also similarly cut, by which means the said portions are adapted to lap one another and to be secured in position by rivets or bolts $a$, as seen in Fig. 1. As a further result of this construction, it will be seen that I avoid sharp angles in the lower corners of the body, and also obtain a rounding junction of the sides and back with the bottom.

To the rear of the respective sides of the body are attached the guide-handles D, in any suitable manner, the same being for the purpose of guiding and raising the rear of the scraper up in order to cause the cutting-edge to take into the ground and bind, so as to cause a partial revolution of the body and a dump of the contents.

Near the forward end of each of the sides B are attached the ears E, by means of bolts or rivets, the same consisting of a flat plate, concaved or recessed on its inner side, as indicated by the letter $e$, and of a tubular extension, E', projecting from the plate and provided with an aperture, F, having a slot, F', at its rear side.

The letter G indicates the draft-bail, which is constructed of an iron or other suitable rod, and is provided near its end with a right-angle extension, G', having its extremity turned or bent forward, as indicated, forming a lug, $g$, by which the bail is normally secured in the ear. In order to disengage the bail from the ear for shipment or other purposes, the body of the scraper is inverted and the bail thrown back until the lugs $g$ on its extremity are opposite the slots F' of the hole F.

Having thus fully described my invention, what I claim as new, and desire to secure by Letters Patent, is—

The combination, in a road-scraper, of an ear having an aperture and a slot at one side, with a bail having a right-angled lug, whereby the bail is held in place and rendered detachable, substantially as specified.

In testimony whereof I affix my signature in presence of two witnesses.

EDWARD HUBER.

Witnesses:
C. H. NORRIS,
GEO. B. CHRISTIAN.